United States Patent
Luders

(10) Patent No.: US 10,501,085 B2
(45) Date of Patent: Dec. 10, 2019

(54) EARLY OBJECT DETECTION FOR UNPROTECTED TURNS

(71) Applicant: Waymo LLC, Mountain View, CA (US)

(72) Inventor: Brandon Douglas Luders, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 188 days.

(21) Appl. No.: 15/834,535

(22) Filed: Dec. 7, 2017

(65) Prior Publication Data

US 2019/0176829 A1 Jun. 13, 2019

(51) Int. Cl.
- *B60W 30/18* (2012.01)
- *G05D 1/00* (2006.01)
- *G05D 1/02* (2006.01)
- *G01S 17/89* (2006.01)

(Continued)

(52) U.S. Cl.
CPC ..... *B60W 30/18163* (2013.01); *G05D 1/0088* (2013.01); *G05D 1/021* (2013.01);
(Continued)

(58) Field of Classification Search
CPC . B60R 16/03; B60R 21/01554; B60R 21/015; B60R 16/023; B60R 21/0134; B60R 21/0132; B60R 21/01512; B60T 8/175; B60T 8/32; B60T 8/3205; B60W 30/12; B60W 30/18109; B60W 10/184; B60W 30/18172; B60W 30/18; B60W 40/08; B60W 30/09; B60W 30/182; B60W 30/18163; B62D 15/02; B62D 15/025; B62D 6/00; A01B 69/00; G06K 9/00791; G01C 21/206; G01C 21/165; G01C 21/00; G01C 21/34; G01C 21/3415; H04Q 9/00; G05D 1/0246; G05D 1/00; G05D 1/021; G06F 7/00; B60K 28/14; G01S 19/13;
(Continued)

(56) References Cited

U.S. PATENT DOCUMENTS 6,975,246 B1  12/2005  Trudeau
9,146,113 B1 * 9/2015  Funk ............... G01C 21/206
(Continued)

FOREIGN PATENT DOCUMENTS

WO       2017062151       4/2017

OTHER PUBLICATIONS

International Search Report and Written Opinion for Application No. PCT/US2018/062785 dated Mar. 12, 2019.

*Primary Examiner* — Behrang Badii
(74) *Attorney, Agent, or Firm* — Botos Churchill IP Law

(57) ABSTRACT

A system and method is provided for early detection of objects by a perception system of a vehicle, and triggering a precautionary action by the vehicle in response without waiting for a more precise detection. The vehicle has a multi-level sensor range, wherein a first level of the sensor range is adjacent an outer bounds of the sensor range and has a first confidence value, and a second level of the sensor range is within the first range and has a second higher confidence value. In situations when oncoming traffic is traveling at a high rate of speed, the vehicle responds to noisier detections, or objects perceived with a lower degree of confidence, rather than waiting for verification which may come too late.

21 Claims, 8 Drawing Sheets

(51) Int. Cl.
*B62D 15/02* (2006.01)
*B60W 30/12* (2006.01)
*A01B 69/00* (2006.01)
*G01S 17/93* (2006.01)

(52) U.S. Cl.
CPC .............. *A01B 69/00* (2013.01); *B60W 30/12* (2013.01); *B62D 15/02* (2013.01); *B62D 15/025* (2013.01); *G01S 17/89* (2013.01); *G01S 17/93* (2013.01); *G05D 1/00* (2013.01); *G05D 1/02* (2013.01); *G05D 1/0214* (2013.01)

(58) Field of Classification Search
CPC ....... H04L 67/12; H04W 52/28; G08G 1/017; G08G 1/0965; G08G 1/096827; G08G 1/096844
See application file for complete search history.

(56) References Cited

U.S. PATENT DOCUMENTS

| | | | |
|---|---|---|---|
| 9,255,805 B1 | 2/2016 | Ferguson et al. | |
| 9,555,740 B1 | 1/2017 | Zhu et al. | |
| 9,840,253 B1* | 12/2017 | Prasad | B60W 30/12 |
| 2010/0235129 A1 | 9/2010 | Sharma | |
| 2014/0032012 A1 | 1/2014 | Joshi et al. | |
| 2016/0214607 A1 | 7/2016 | Dolgov et al. | |
| 2017/0168502 A1* | 6/2017 | Gordon | G06K 9/00791 |
| 2017/0248964 A1 | 8/2017 | Kentley et al. | |
| 2019/0047527 A1* | 2/2019 | Falconer | B60T 8/175 |
| 2019/0143917 A1* | 5/2019 | Lee | B60R 21/01554 307/10.1 |
| 2019/0196481 A1* | 6/2019 | Tay | G05D 1/0214 |

* cited by examiner

EARLY OBJECT DETECTION FOR UNPROTECTED TURNS

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

While some autonomous vehicles are operable in a semi-autonomous mode, such as where a human driver takes over control of the vehicle in some circumstances, it is nevertheless important for the autonomous vehicle to operate in the safest manner possible.

BRIEF SUMMARY

One aspect of the disclosure provides a method for maneuvering a vehicle. The method includes defining, for an autonomous vehicle having one or more sensors, a first sensor range having a first associated confidence value, the first sensor range adjacent an outer bound of reach of the one or more sensors, and defining a second sensor range, the second sensor range having a second associated confidence value that is higher than the first confidence value, the second sensor range being within the first sensor range and closer to the one or more sensors than the first sensor range. The method further includes receiving, at one or more processors, input from the one or more sensors, detecting, by the one or more processors based on the input received from the one or more sensors, an object within the first sensor range of the vehicle, and causing the vehicle to take a first action in response to detecting the object within the first sensor range, prior to the object being detected within the second sensor range, wherein the first action comprises at least one of yielding, ceasing acceleration, decelerating, or switching lanes. In some examples, the method may further include detecting, by the one or more processors based on further input received from the one or more sensors, that the object has moved into the second sensor range of the vehicle, and validating the detection of the object within the first sensor range based on the detection of the object within the second sensor range.

The vehicle, when receiving the input from the one or more sensors, may be waiting to merge onto a roadway having a speed limit of 45 miles per hour or higher. In this example, the object detected within the first sensor range may be a second vehicle traveling on the roadway, and the first action may include continuing to wait to merge onto the roadway. In another example, the vehicle, when receiving the input from the one or more sensors, is traveling in a first lane of a roadway having a speed limit of 45 miles per hour or higher, the object detected within the first sensor range is a second vehicle traveling in the first or a second lane on the roadway, and approaching the vehicle from behind, and the first action includes changing lanes away from the lane in which the second vehicle is traveling. In yet a further example, the vehicle, when receiving the input from the one or more sensors, is making an unprotected turn onto a roadway, the object detected within the first sensor range is a second vehicle traveling along the roadway towards the vehicle, and the first action may include waiting to make the unprotected turn until the first and second sensor ranges are clear.

Another aspect of the disclosure provides a system, including one or more sensors, the one or more sensors having a first defined range adjacent an outer bound of reach of the one or more sensors, the first defined range having a first associated confidence value, and a second defined range within the first sensor range and closer to the one or more sensors than the first sensor range, the second defined range having a second associated confidence value that is higher than the first confidence value. The system further includes one or more processors in communication with the one or more sensors, wherein the one or more processors are configured to receive input from the one or more sensors, detect, based on the input received from the one or more sensors, an object within the first sensor range of the vehicle, and cause the vehicle to take a first action in response to detecting the object within the first sensor range, prior to the object being detected within the second sensor range, wherein the first action comprises at least one of yielding, ceasing acceleration, decelerating, or switching lanes.

Yet another aspect of the disclosure provides a vehicle, including a driving system including at least an acceleration system, a braking system, and a steering system, and a perception system including at least one or more sensors. The one or more sensors have a first defined range adjacent an outer bound of reach of the one or more sensors, the first defined range having a first associated confidence value, and a second defined range within the first sensor range and closer to the one or more sensors than the first sensor range, the second defined range having a second associated confidence value that is higher than the first confidence value. The vehicle further includes a control system including at least one or more processors in communication with the one or more sensors. The one or more processors are configured to receive input from the one or more sensors, detect, based on the input received from the one or more sensors, an object within the first sensor range of the vehicle, and cause the vehicle to take a first action in response to detecting the object within the first sensor range, prior to the object being detected within the second sensor range, wherein the first action comprises at least one of yielding, ceasing acceleration, decelerating, or switching lanes. The vehicle of may in some examples be autonomous.

DETAILED DESCRIPTION

Overview

Figure 1:
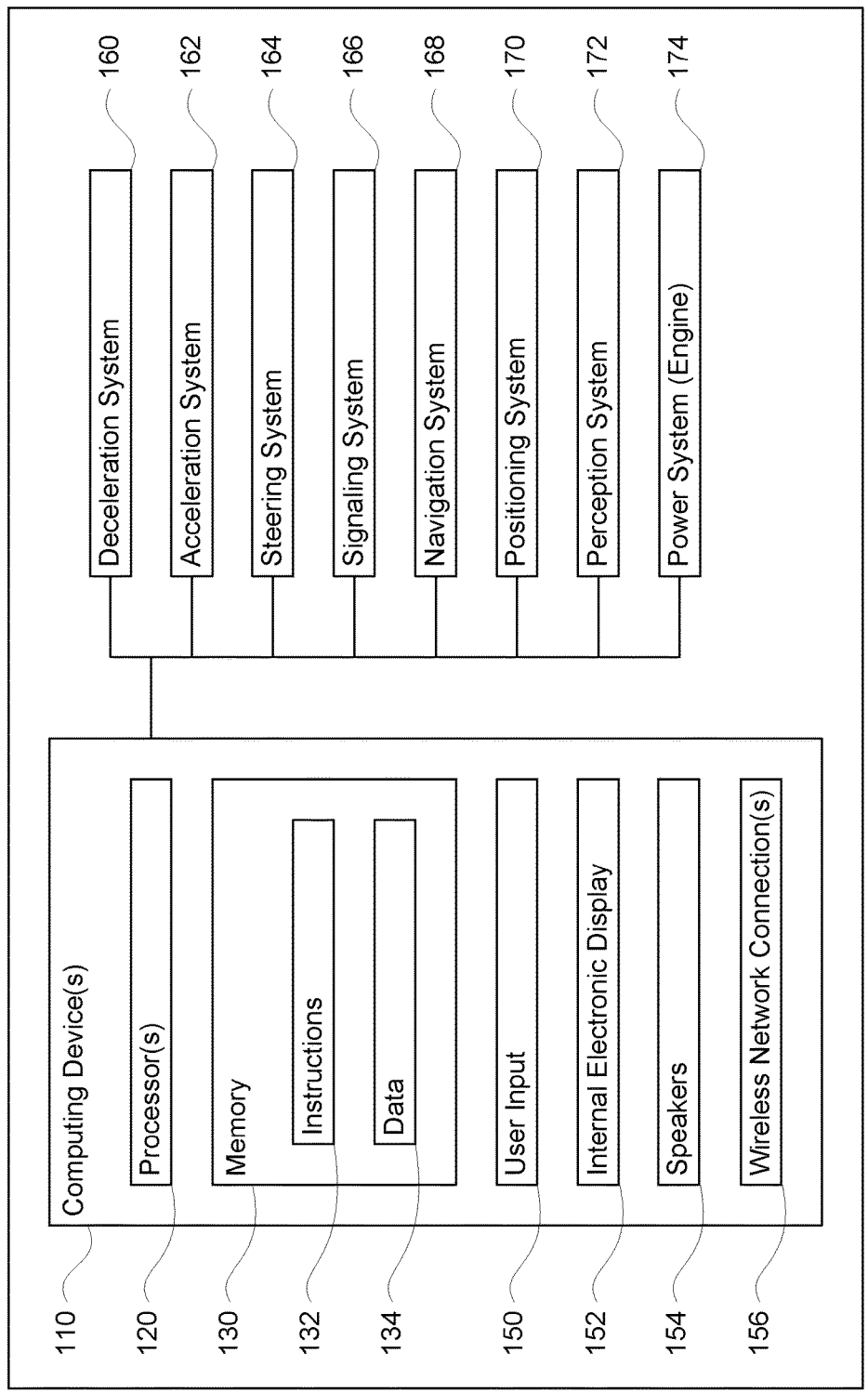
FIG. 1 is a functional diagram of an example vehicle in accordance with an exemplary embodiment.

The technology relates to detection of objects by an autonomous vehicle. In particular, in some driving situations, the autonomous vehicle may operate based on an early detection of an object, without waiting for a more precise detection. For example, whereas an autonomous vehicle may typically wait until objects are detected within a sensor range having a relatively high associated confidence value, the present technology provides for earlier detection based on detection within a noisier sensor range.

An autonomous vehicle according to the present technology has a multi-level sensor range, wherein a first, less precise level of the sensor range is adjacent an outer bounds of the sensor range, and a second, more precise level of the sensor range is inside the first range. As such, the first range may have a lower associated confidence value than the second range. For example, objects detected within the first range are likely to actually be present with a first degree of certainty, while objects detected within the second range are likely to actually be present with a second degree of certainty which is higher than the first.

In some cases, an object (e.g., house, foliage, parked car, etc.) may be blocking a sensor's view. In such cases, the "first range" may be immediately adjacent to the occluded area, where a moving object would first emerge from occlusion but would still have a lower confidence value. The "second range" may be adjacent to the first range, but further downstream from the occluded area, where confidence values are higher.

Driving situations in which early detection may be used may include those in which the autonomous vehicle is expected to yield to other traffic, such as when merging onto a highway, or when crossing one or more lanes of traffic to make a left turn. Such early detection is particularly advantageous when oncoming traffic is traveling at a high rate of speed, such as 50 mph or above. In such instances, it may take too long for the autonomous vehicle to receive higher quality detection in time to take the required driving action safely, such as merging or turning. By responding to noisier detections, or objects perceived with a lower degree of confidence, an appropriate driving action can safely be taken earlier, and thus within time before the detected object becomes too close. The appropriate driving action may be, for example, waiting to merge or turn until no oncoming objects are detected within a field of view of the sensors.

Detecting objects within the first sensor range, having the lower confidence value, may produce false positives. However, responding as if an object is present, when it actually is not, is typically a safer response.

The sensors used to detect objects may include any of a variety of sensors, including those typically included in autonomous vehicles. For example, the sensors may include radar, LIDAR, sonar, or cameras.

In some examples, a confidence level of objects detected within the first sensor range may be improved using various techniques. For example, input received from sensors within the first sensor range may be filtered, such that only detections at or above a threshold signal-to-noise ratio (SNR) will trigger a reaction. This reaction may be different than a reaction to a detection confirmed in the second sensor range. For example, a preliminary reaction triggered by detection within the first sensor range may include limited braking, whereas a confirmed detection in the second sensor range may trigger full braking. In other examples, different types of sensors may be used to detect the object within the first sensor range, and the input from those different types of sensors may be cross-validated. For example, if both a radar sensor and a LIDAR sensor detected the object within the first sensor range, the object may be determined to be present. In contrast, if only the radar sensor detected the object within the first sensor range, and the LIDAR did not, the object may be determined to not actually be present.

In other examples, a confidence level of objects detected across a pipeline of both the first sensor range and the second sensor range may also be improved. For example, in addition to extracting features from a current set of perception data, such as SNR, cross-validation, etc., the object may be tracked temporally over multiple iterations of perception data. For example, object properties having temporal elements, such as speed and acceleration, may be tracked.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 2:
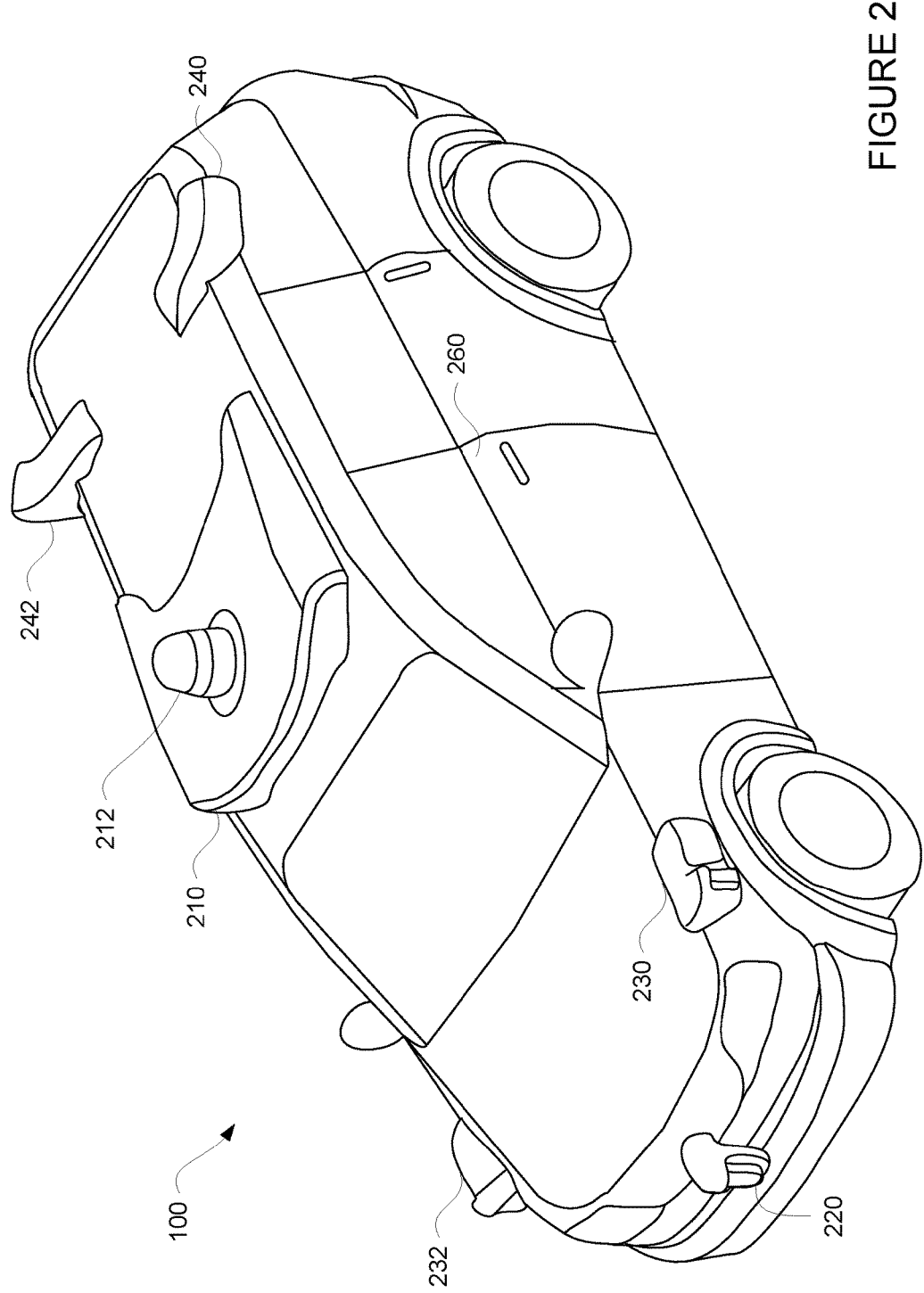
FIG. 2 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a lidar sensor as well as various cameras and radar units. In addition, housing 220 located at the front end of vehicle 100 and housings 230, 232 on the driver's and passenger's sides of the vehicle may each store a lidar sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
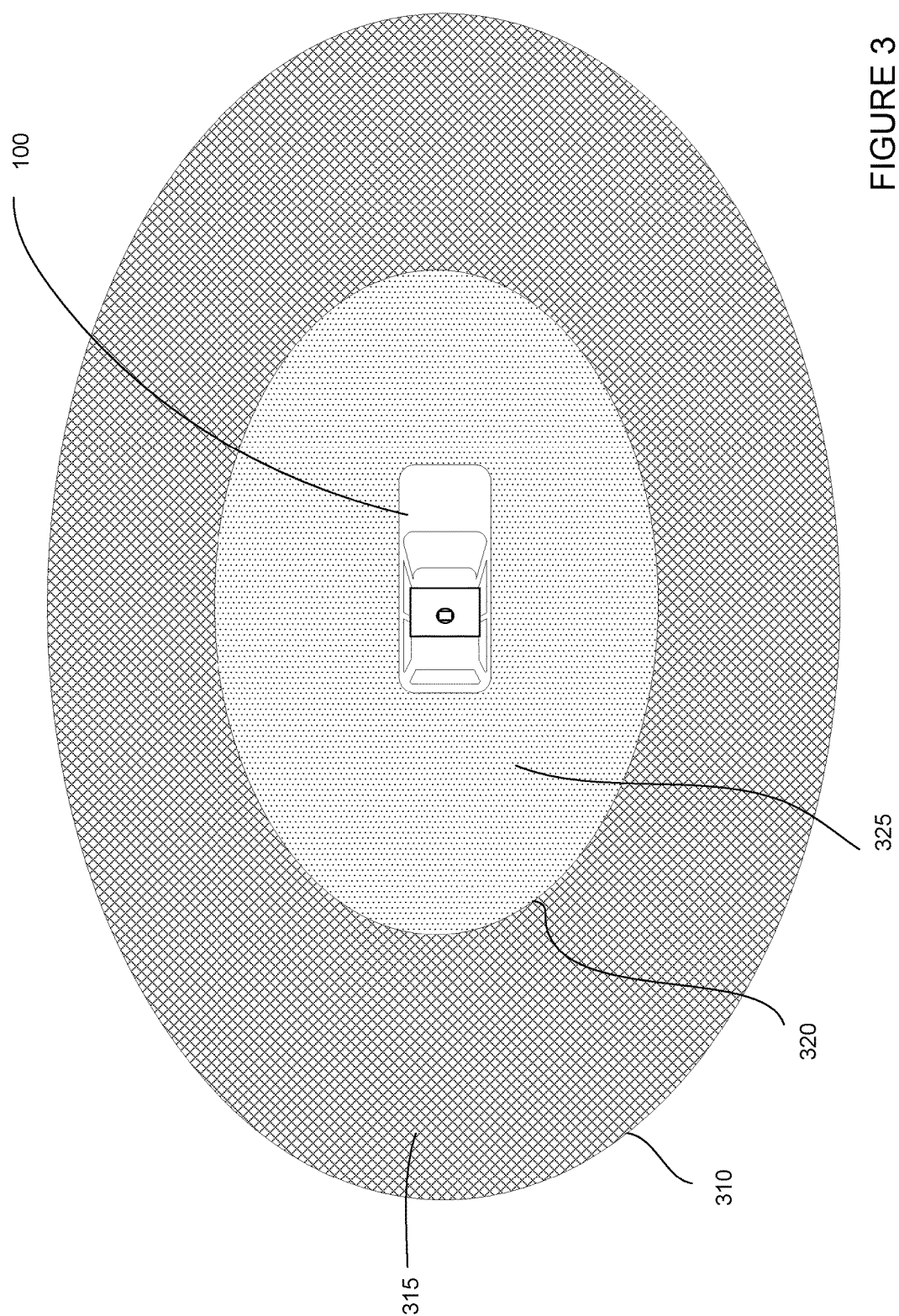
FIG. 3 is an example bird's eye view of a first sensor range and a second sensor range of the vehicle in accordance with an exemplary embodiment.

FIG. 3 illustrates an example of defined sensor ranges, wherein different vehicle responses may be triggered by detection of objects in the different sensor ranges. As mentioned above, the vehicle 100 has one or more sensors, such as radar, LIDAR, cameras, etc. The one or more sensors have an outer bound of reach, illustrated by boundary 310. For example, the boundary 310 may represent an extent of a field of view of the one or more sensors, such that the sensors do not detect objects outside the boundary 310. In some examples, the sensor field of view may be occluded, such as by a tree, building, etc. In this case, the outer boundary 310 may be at least partially defined by the occluding object. In other examples, a distance between the sensor on the vehicle and the outer boundary 310 may depend on, for example, the type of sensor used. For example, a radar sensor may have a reach of approximately 160-200 m, while a LIDAR sensor may have a reach of approximately 85-160 m.

Within the outer boundary 310 is a first sensor range 315. The first sensor range has a first confidence value associated therewith. Sensor signals reaching the first range and near the outer boundary 310 may be noisy because of long range and/or short distance traversed inside a reach of the sensor (e.g., less time within a sensor field of view). Accordingly, the first confidence value may be relatively low.

Within the first range sensor range 315, and closer to the vehicle 100, is second sensor range 325. Boundary 320 may define the first sensor range 315 from the second sensor range 325. The second sensor range 325 may be, for example, approximately 10-30 m shorter in range than the first sensor range 315, or more. The second sensor range 325 is associated with a second confidence value. Signals within the second sensor range 325 are less noisy and more precise than sensor signals within the first sensor range, because the signals in the second sensor range 325 are not as far reaching as those in the first sensor range 315. Accordingly, the second confidence value is higher than the first confidence value.

According to some examples, the boundary 320 between the first sensor range 315 and the second sensor range 325 may be determined based on signal quality, distance from or bearing to the one or more sensors, and/or other factors. By way of example only, the boundary 320 may be set at a threshold distance, a threshold signal to noise ratio, or some combination thereof. In this regard, the boundary 320 may be varied along with changes in signal quality. In other examples, the boundary 320 may be redefined to accommodate for other factors, such as weather, visibility, sensor degradation, etc.

While only two sensor ranges are defined in the example described above, it should be understood that additional sensor ranges may also be defined, such as a third sensor range, fourth sensor range, etc.

Different actions of the vehicle 100 may be triggered based on the sensor range in which an object is detected. For example, if an object is detected in the first sensor range 315, the vehicle 100 may take a preliminary action, such as yielding, decelerating, ceasing acceleration, changing lanes, waiting, etc. If the object moves within the second sensor range 325, however, the vehicle 100 may take a different responsive action, such as stopping, or another action. In some examples, detection of the object within the second range 325 may serve as a verification of the previous detection of the object within the first range 315. In this regard, the first action taken in response to the first detection may be considered a preliminary action in preparation for the second action taken in response to the second detection.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
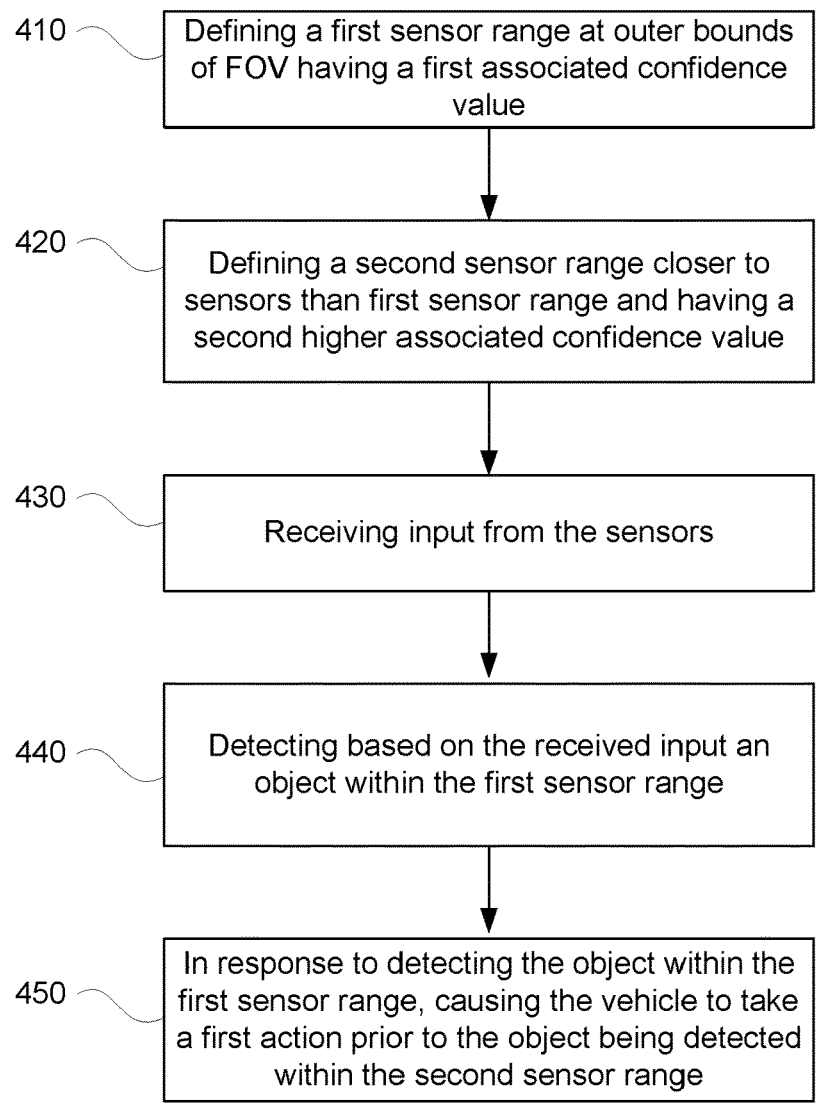
FIG. 4 is an example flow diagram in accordance with aspects of the disclosure.

FIG. 4 is a flow diagram illustrating an example method of designating multiple ranges of sensor field of view, and operating an autonomous vehicle in response to detection of objects in one of the multiple ranges.

In block 410, a first sensor range is defined at an outer bounds of a field of view of one or more sensors on a vehicle. The first sensor range has a first associated confidence value. The first confidence value may be determined based on, for example, signal quality, error rate, or other information. Because the first sensor range is near an outer bounds of the field of view, input signals received at the one or more sensors are likely to be noisier than other portions of the field of view. Accordingly, the confidence value for the first sensor range may be relatively low as compared to other portions of the field of view.

In block 420, a second sensor range is defined, wherein the second sensor range is closer to the one or more sensors than first sensor range, such as shown in FIG. 3. The second sensor range has a second associated confidence value, wherein the second confidence value is higher than the first confidence value. For example, signals within the second sensor range, which travel less distance relative to signals traveling to the first sensor range, may be more accurate and less noisy. Additionally, objects that have come within the second range have traveled a greater distance within the overall detectable range. A boundary between the first sensor range and the second sensor range may be determined, for example, based on the associated confidence values or other accuracy quantifiers. For example, the boundary may be set based on a threshold distance, a threshold confidence value, or the like.

In block 430, one or more processors of the vehicle receive input from the one or more sensors. According to some examples, where the one or more sensors include a plurality of different types of sensors, the received input may include input from multiple sources.

In block 440, an object within the first sensor range is detected based on the received input. The object may be, for example, a pedestrian, a cyclist, another vehicle, or any other object the vehicle should avoid. In many examples, the object may be moving or about to move. For example, the object may be approaching the vehicle on the driver side as the vehicle prepares to make a left turn. In other examples, the object may be approaching the vehicle from behind as the vehicle travels on a roadway. In other examples, the object may be traveling in a right lane of a highway onto which the vehicle is waiting to merge. While these are merely a few examples, it should be understood that the object may be detected in any of a number of circumstances. In the example where multiple sensors of different types are providing input to one or more processors, the object may be detected by two or more of the different types of sensors. The signals from the different types of sensors may thus be used to cross-validate one another.

In block 450, in response to detecting the object within the first sensor range, the vehicle is triggered to take a first action prior to the object being detected within the second sensor range. The first action may be, for example, waiting to turn or merge, decelerating, ceasing acceleration, or another precautionary action.

In some examples, taking the action in response to detecting the object within the first sensor range may be limited based on further criteria. For example, the action may only be taken if the signal to noise ratio of signals detecting the object is at or above a predetermined threshold, such as by filtering out signals with a signal to noise ratio below the predetermined threshold. Where different types of sensors are used to cross-validate one another, the action may only be taken if the input is cross-validated.

In some examples, the method may further include detecting, based on further input received from the one or more sensors, that the object has moved into the second sensor range of the vehicle. In such examples the detection of the object within the second range may be used to validate the detection of the object in the first range. Accordingly, the vehicle may take a secondary action in response, such as stopping, continuing to wait, etc.

Figure 5:
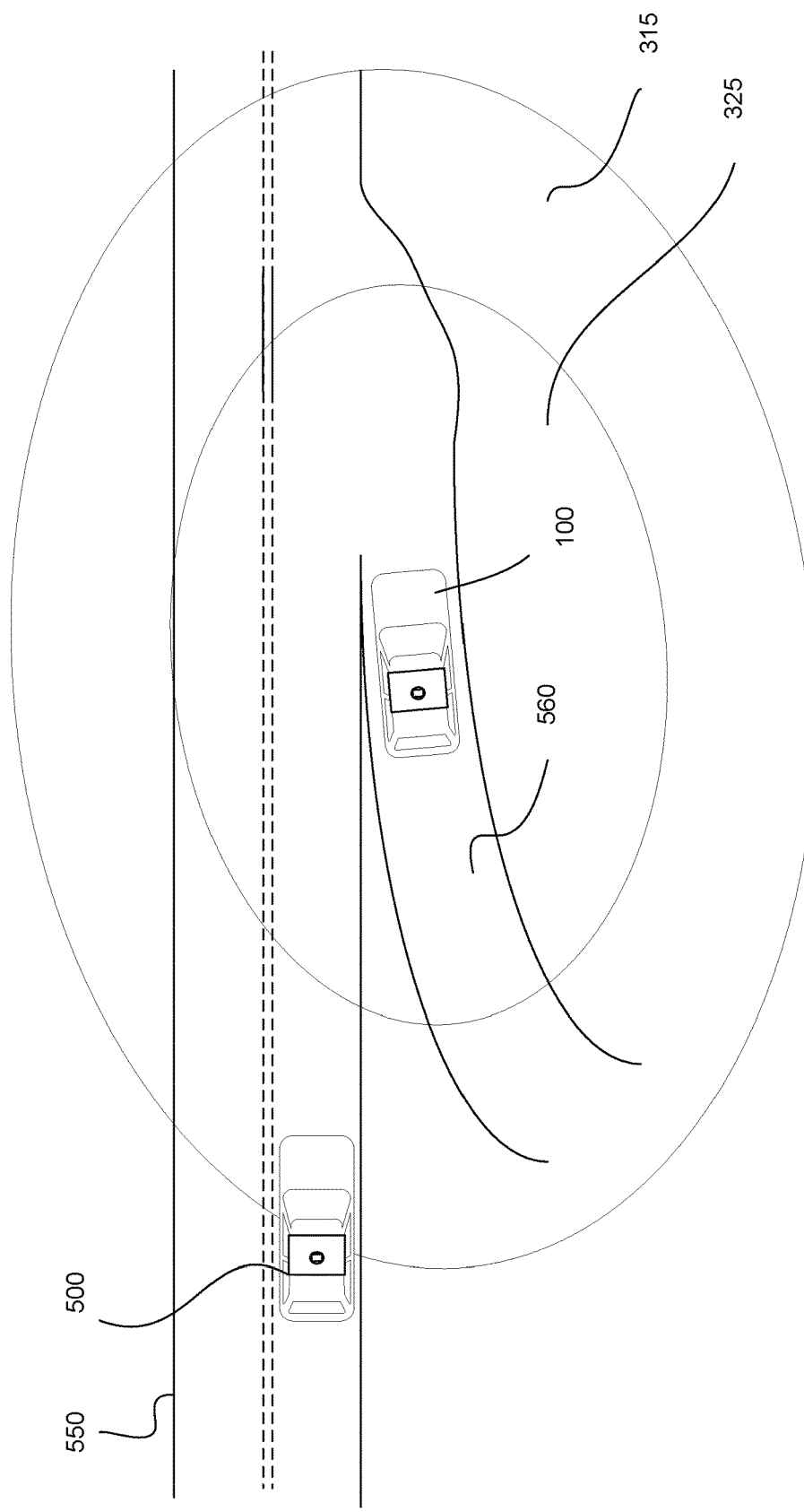
FIG. 5 is an example bird's eye view of the vehicle reacting within a geographic area of a first type in accordance with aspects of the disclosure.

FIGS. 5-8 illustrate some example scenarios in which the vehicle responds to detection of objects within the first sensor range. As shown in FIG. 5, the vehicle 100 is traveling on an entry ramp 560 to roadway 550. The roadway 550 may be a high speed roadway, such as where vehicles travel approximately 40 miles per hour and faster. The second sensor range 325, which has a perimeter closer to the vehicle 100 than the first sensor range 315, is clear. In other words, no objects are detected within the second sensor range 325. If the vehicle 100 were to rely solely on this indication from the second sensor range 325, it may proceed to enter the roadway 550 and either "cut off" the vehicle 500 or cause a collision or near-collision with the vehicle 550. The first sensor range 315, however, includes the vehicle 500. Accordingly, although the first sensor range 315 may have a lower confidence value, its indication of oncoming vehicle may be heeded as precaution. As such, the vehicle 100 may yield to the vehicle 500, and wait to merge onto the roadway 550. If detection of the vehicle 500 in the first sensor range 315 is a false positive, and no vehicle is actually present within the first sensor range 315, yielding or waiting should not cause any danger due to the limited nature of reactions triggered by detections within the first sensor range.

Figure 6:
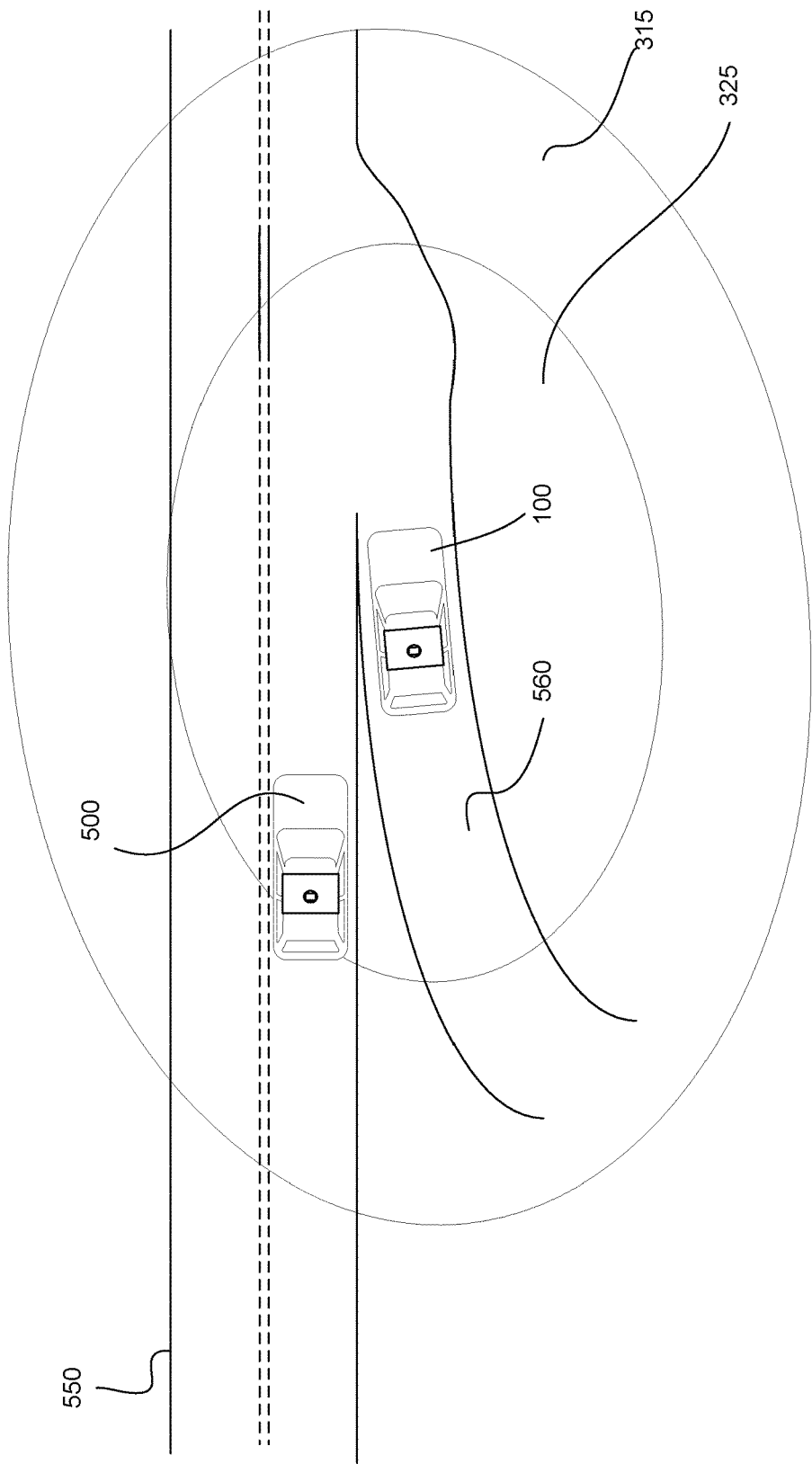
FIG. 6 is another example bird's eye view of the vehicle reacting within the geographic area of FIG. 5 in accordance with aspects of the disclosure.

As shown in FIG. 6, the vehicle 500 has moved into the second sensor range 325. Such detection of the vehicle 500 within the second sensor range 325 may be used to validate the detection in the first sensor range 315. According to some examples, such validation may be used for adjusting confidence values for future detections in the first sensor range, calibrating sensors, training the one or more processors to trigger reactions for detections within the first sensor range, or for any other purpose. For example, if at a future time in a similar circumstance the vehicle 100 detects an object resembling a vehicle within the first sensor range 315, the one or more processors of the vehicle 100 may determine with greater confidence that a vehicle is actually approaching.

Figure 7:
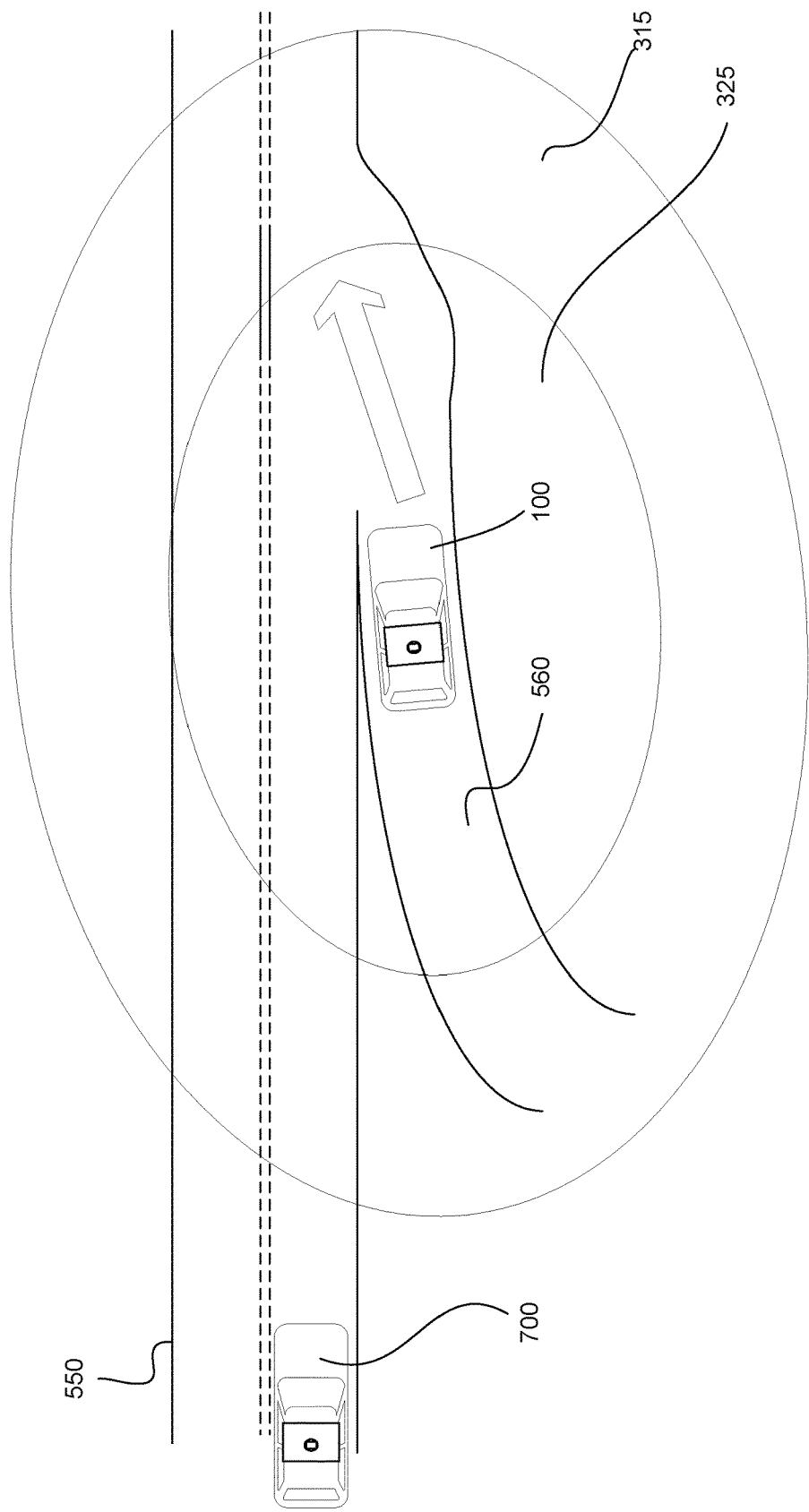
FIG. 7 is another example bird's eye view of the vehicle reacting within the geographic area of FIG. 5 in accordance with aspects of the disclosure.

As shown in the example of FIG. 7, while vehicle 700 is traveling on the roadway 550 towards the entrance ramp 560, it is so far away from the vehicle 100 that it is outside the field of view. In this example, the maximum sensor range of the vehicle 100 is sufficiently long that a clear field of view would indicate a sufficient buffer between the vehicle 100 and the vehicle 700 for the vehicle 100 to safely enter roadway 550. The vehicle 700 is beyond the outer bounds of the first sensor range 315, and thus beyond a point of detection by any of the sensors on the vehicle 100. Because the vehicle 700 is outside the field of view, it may be far enough away from the vehicle 100 that the vehicle 100 can safely enter the roadway 550. Accordingly, as both the first and second sensor ranges are clear and sufficiently large to safely detect traffic, and no oncoming traffic is detected at even a low signal to noise ratio, the vehicle 100 proceeds to merge onto the roadway 550.

Figure 8:
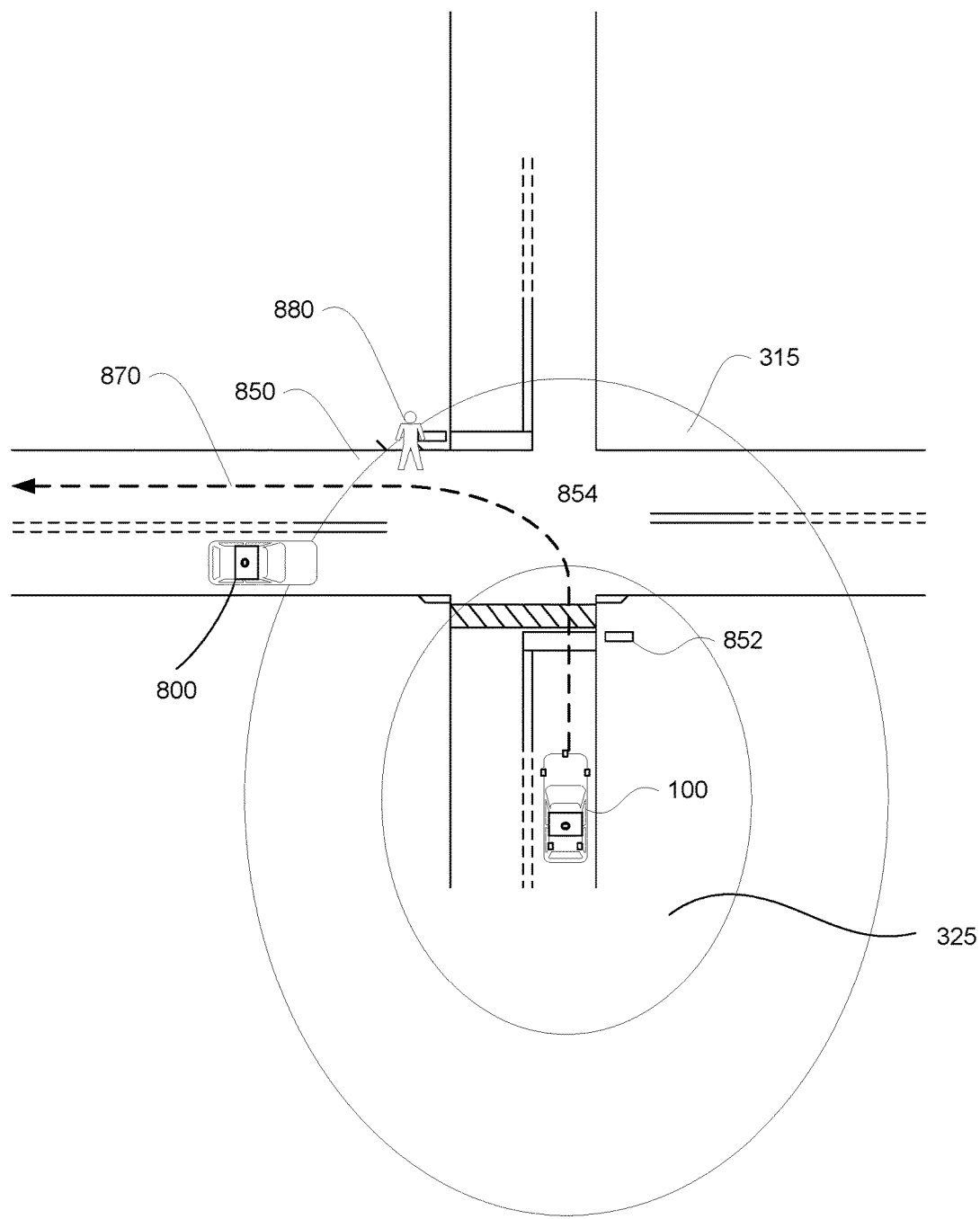
FIG. 8 is an example bird's eye view of the vehicle reacting within a geographic area of a second type in accordance with aspects of the disclosure.

FIG. 8 illustrates another scenario, where the vehicle 100 is planning to make an unprotected left turn onto roadway 850 along path 870. An unprotected turn in this example is one where the vehicle 100 crosses a lane of traffic that has the right of way. While the vehicle 100 must stop at stop sign 852, there are no signs, traffic lights, or other requirements for traffic traveling along the roadway 850 to stop, slow down, yield, or the like. Thus, as the vehicle 100 makes a left turn through intersection 854 and into roadway 850, there is some risk that a vehicle traveling towards the intersection 854, such as the vehicle 800, will collide with the vehicle 100 if the vehicle 100 enters the intersection 854. Accordingly, the vehicle 100 detects whether any vehicles are approaching to avoid such a collision. To give the vehicle 100 as much notice as possible, the vehicle 100 detects whether any objects are within the first sensor range 315. Accordingly, the vehicle 100 may detect at least a portion of the vehicle 800. In response, the vehicle 100 may continue to wait at the stop sign 852 until the field of view is clear.

Within the first sensor range 315, the vehicle 100 also detects pedestrian 880 who has begun crossing the roadway 850. Accordingly, in this context the vehicle 100 may also respond to the pedestrian 880 by waiting to make the turn.

While several examples of maneuvers by the vehicle 100 benefiting from early perception in the first sensor range are described above, it should be understood that these examples are in no way limiting and that the technology may be applied in any of a number of other instances. For example, where traffic in an adjacent lane on a high speed roadway is moving faster than the vehicle, the vehicle may benefit by early detection of such traffic. In response, the vehicle may change lanes or take another precautionary action. Other examples may include any situation in which the vehicle should yield to another vehicle which it cannot yet see with high confidence.

By observing and adhering to noisy signals at an outer bounds of a sensor range, the vehicle may take a precautionary action which results in safer operation of the vehicle. For example, as opposed to requiring an abrupt deceleration and stop when an object is detected at a closer range, the vehicle may prepare by ceasing acceleration. In addition to an improved riding experience for passengers of the vehicle, the precautionary actions of the vehicle increase the safety of everyone sharing the roadway.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for maneuvering a vehicle, the method comprising:
   defining, for an autonomous vehicle having one or more sensors, a first sensor range having a first associated confidence value, the first sensor range adjacent an outer bound of reach of the one or more sensors;
   defining a second sensor range, the second sensor range having a second associated confidence value that is higher than the first confidence value, the second sensor range being within the first sensor range and closer to the one or more sensors than the first sensor range;
   receiving, at one or more processors, input from the one or more sensors;
   detecting, by the one or more processors based on the input received from the one or more sensors, an object within the first sensor range of the vehicle; and
   causing the vehicle to take a first action in response to detecting the object within the first sensor range, prior to the object being detected within the second sensor range, wherein the first action comprises at least one of yielding, ceasing acceleration, decelerating, or switching lanes.

2. The method of claim 1, further comprising:
   detecting, by the one or more processors based on further input received from the one or more sensors, that the object has moved into the second sensor range of the vehicle; and
   validating the detection of the object within the first sensor range based on the detection of the object within the second sensor range.

3. The method of claim 2, further comprising causing the vehicle to take a second action in response to detecting the object in the second sensor range.

4. The method of claim 3, wherein the second action is different from the first action.

5. The method of claim 1, further comprising:
   determining, with the one or more processors, a signal to noise ratio associated with the input received from the one or more sensors;
   filtering the input received from the one or more sensors to ignore signals with a signal to noise ratio below a threshold value.

6. The method of claim 1, wherein receiving the input from the one or more sensors comprises receiving a first type of input and receiving a second type of input, and further comprising:
   cross-validating the first type of input and the second type of input.

7. The method of claim 6, wherein first type of input is from a first sensor and the second type of input is from a second sensor being of a different sensor type than the first sensor.

8. The method of claim 1, wherein:
   the vehicle, when receiving the input from the one or more sensors, is waiting to merge onto a roadway having a speed limit of 45 miles per hour or higher;
   the object detected within the first sensor range is a second vehicle traveling on the roadway; and
   the first action comprises continuing to wait to merge onto the roadway.

9. The method of claim 1, wherein:
   the vehicle, when receiving the input from the one or more sensors, is traveling in a first lane of a roadway having a speed limit of 45 miles per hour or higher;
   the object detected within the first sensor range is a second vehicle traveling in the first or a second lane on the roadway, and approaching the vehicle from behind; and
   the first action comprises avoiding the lane in which the second vehicle is traveling.

10. The method of claim 1, wherein:
    the vehicle, when receiving the input from the one or more sensors, is making an unprotected turn onto a roadway;
    the object detected within the first sensor range is a second vehicle traveling along the roadway towards the vehicle; and
    the first action comprises waiting to make the unprotected turn until the first and second sensor ranges are clear.

11. A system, comprising:
    one or more sensors, the one or more sensors having:
    a first defined range adjacent an outer bound of reach of the one or more sensors, the first defined range having a first associated confidence value; and
    a second defined range within the first sensor range and closer to the one or more sensors than the first sensor range, the second defined range having a second associated confidence value that is higher than the first confidence value;
    one or more processors in communication with the one or more sensors, wherein the one or more processors are configured to:
    receive input from the one or more sensors;
    detect, based on the input received from the one or more sensors, an object within the first sensor range of the vehicle; and
    cause the vehicle to take a first action in response to detecting the object within the first sensor range, prior to the object being detected within the second sensor range, wherein the first action comprises at least one of yielding, ceasing acceleration, decelerating, or switching lanes.

12. The system of claim 11, wherein the one or more processors are further configured to cause the vehicle to take a second action in response to detecting the object in the second sensor range.

13. The system of claim 11, wherein the one or more processors are further configured to:
    detect, based on further input received from the one or more sensors, that the object has moved into the second sensor range of the vehicle; and
    validate the detection of the object within the first sensor range based on the detection of the object within the second sensor range.

14. The system of claim 11, wherein the one or more processors are further configured to:
    determine a signal to noise ratio associated with the input received from the one or more sensors; and
    filter the input received from the one or more sensors to ignore signals with a signal to noise ratio below a threshold value.

15. The system of claim 11, wherein:
the one or more sensors comprise at least a first sensor of a first type and a second sensor of a second type different than the first type.

16. The system of claim 15, wherein receiving the input from the one or more sensors comprises receiving a first type of input from the first sensor and receiving a second type of input from the second sensor, and wherein the one or more processors are further configured to cross-validate the first type of input and the second type of input.

17. A vehicle, comprising:
a driving system including at least an acceleration system, a braking system, and a steering system;
a perception system including at least one or more sensors, the one or more sensors having:
a first defined range adjacent an outer bound of reach of the one or more sensors, the first defined range having a first associated confidence value; and
a second defined range within the first sensor range and closer to the one or more sensors than the first sensor range, the second defined range having a second associated confidence value that is higher than the first confidence value;
a control system including at least one or more processors in communication with the one or more sensors, wherein the one or more processors are configured to:
receive input from the one or more sensors;
detect, based on the input received from the one or more sensors, an object within the first sensor range of the vehicle; and
cause the vehicle to take a first action in response to detecting the object within the first sensor range, prior to the object being detected within the second sensor range, wherein the first action comprises at least one of yielding, ceasing acceleration, decelerating, or switching lanes.

18. The vehicle of claim 17, wherein the vehicle is autonomous.

19. The vehicle of claim 17, wherein:
the vehicle, when receiving the input from the one or more sensors, is waiting to merge onto a roadway having a speed limit of 45 miles per hour or higher;
the object detected within the first sensor range is a second vehicle traveling on the roadway; and
the first action comprises continuing to wait to merge onto the roadway.

20. The vehicle of claim 17, wherein:
the vehicle, when receiving the input from the one or more sensors, is traveling in a first lane of a roadway having a speed limit of 45 miles per hour or higher;
the object detected within the first sensor range is a second vehicle traveling in the first or a second lane on the roadway, and approaching the vehicle from behind; and
the first action comprises avoiding the lane in which the second vehicle is traveling.

21. The vehicle of claim 17, wherein:
the vehicle, when receiving the input from the one or more sensors, is making an unprotected turn onto a roadway;
the object detected within the first sensor range is a second vehicle traveling along the roadway towards the vehicle; and
the first action comprises waiting to make the unprotected turn until the first and second sensor ranges are clear.

* * * * *

UNITED STATES PATENT AND TRADEMARK OFFICE
CERTIFICATE OF CORRECTION

PATENT NO.        : 10,501,085 B2
APPLICATION NO.   : 15/834535
DATED             : December 10, 2019
INVENTOR(S)       : Brandon Douglas Luders Page 1 of 1

It is certified that error appears in the above-identified patent and that said Letters Patent is hereby corrected as shown below:

In the Claims

Claim 7, Column 11, Line 64:
Now reads "wherein first type"; should read -- wherein the first type --

Claim 11, Column 12, Line 41:
Now reads "sensor range of the"; should read -- sensor range of a --

Signed and Sealed this
Eleventh Day of February, 2020

Andrei Iancu
*Director of the United States Patent and Trademark Office*